US012746978B2

(12) United States Patent
Mayumi

(10) Patent No.: US 12,746,978 B2
(45) Date of Patent: Sep. 29, 2026

(54) VEHICLE BODY FRONT STRUCTURE

(71) Applicant: TOYOTA JIDOSHA KABUSHIKI KAISHA, Toyota (JP)

(72) Inventor: Ren Mayumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 18/749,689

(22) Filed: Jun. 21, 2024

(65) Prior Publication Data

US 2025/0100625 A1 Mar. 27, 2025

(30) Foreign Application Priority Data

Sep. 22, 2023 (JP) ................................ 2023-158001

(51) Int. Cl.
*B62D 25/14* (2006.01)
*B62D 25/20* (2006.01)

(52) U.S. Cl.
CPC ........ *B62D 25/145* (2013.01); *B62D 25/2009* (2013.01)

(58) Field of Classification Search
CPC .............. B62D 25/145; B62D 25/2009; B62D 25/2045
See application file for complete search history.

(56) References Cited

U.S. PATENT DOCUMENTS 6,851,742 B1 * 2/2005 Kubiak ................ B62D 25/145 296/203.02
8,020,913 B2 * 9/2011 Kwolek ............... B62D 25/145 296/72
2008/0315611 A1 * 12/2008 Durocher ............. B62D 25/145 296/72
2014/0319812 A1 * 10/2014 Fukushima .......... B62D 25/145 280/779
2019/0016395 A1 1/2019 Kajikawa
2019/0092393 A1 3/2019 Yamatani et al.

FOREIGN PATENT DOCUMENTS

DE 102012201242 A1 * 8/2012 ........... B62D 25/145
JP 2004-189041 A 7/2004
JP 2012-071765 A 4/2012
JP 2013-226995 A 11/2013
JP 2019-059329 A 4/2019
JP 6953846 82 10/2021

* cited by examiner

*Primary Examiner* — Lori Lyjak
(74) *Attorney, Agent, or Firm* — SoraIP, Inc.

(57) ABSTRACT

The floor brace includes a first brace component and a second brace component. The lower end of the first brace component is connected to a vehicle body floor (floor tunnel). The upper end of the first brace component is connected to the instrument panel reinforcement. The second brace component is shorter than the first brace component. The second brace component includes a fastening piece and an attachment piece. The fastening piece is fastened to the first brace component. The attachment piece is bent from the fastening piece. Further, an ECU, which is an in-vehicle component, is attached to the attachment piece.

3 Claims, 4 Drawing Sheets

VEHICLE BODY FRONT STRUCTURE

CROSS-REFERENCE TO RELATED APPLICATION

This application claims priority to Japanese Patent Application No. 2023-158001 filed on Sep. 22, 2023, incorporated herein by reference in its entirety.

BACKGROUND

1. Technical Field

The present specification discloses a vehicle body front structure. In particular, the present specification discloses a floor brace configuration that supports an instrument panel reinforcement.

2. Description of Related Art

As a reinforcing component for supporting a steering mechanism, an instrument panel reinforcement is mounted on a vehicle body. The instrument panel reinforcement will be hereinafter referred to as "instrument panel R/F" as appropriate.

The instrument panel R/F is covered with an instrument panel that is an interior member. The instrument panel R/F is fixed at a height substantially equal to, for example, the height of a steering wheel.

The instrument panel R/F extends in a vehicle width direction. Both ends of the instrument-panel R/F in the vehicle width direction are supported by A-pillars that are skeletons of the vehicle body.

In order to support the instrument panel R/F in a vertical direction, a floor brace is mounted on the vehicle body. The floor brace is a reinforcing component extending in the vertical direction. The lower end of the floor brace is supported by a floor tunnel. Such a floor brace is disclosed, for example, in Japanese Unexamined Patent Application Publication No. 2013-226995 (JP 2013-226995 A) and Japanese Patent No. 6953846 (JP 6953846 B). Japanese Unexamined Patent Application Publication No. 2019-059329 (JP 2019-059329 A) discloses an example in which a brace member is composed of a plurality of divided bodies.

The upper end of the floor brace is connected to the instrument panel R/F. The upper end of the floor brace is provided with an extension portion extending parallel to the instrument panel R/F. That is, the floor brace extends in the vertical direction and is bent at the upper end to extend in the vehicle width direction. An in-vehicle component is attached to the extension portion ahead of the bending point. An in-vehicle component such as an electronic control unit (ECU) is attached.

SUMMARY

In order to bend the upper end of the floor brace that is a long reinforcing component, a high-level machining technique is required. First, the flexural strength is high because the floor brace is a reinforcing component. That is, the floor brace is difficult to bend.

Next, when the upper end of the floor brace is bent, the position of the lower end of the floor brace changes due to variation in the bending angle. The position of the lower end refers to a position of the lower end relative to the upper end. Since the floor brace is a long component, a slight difference in the bending angle leads to large positional misalignment of the lower end of the floor brace. Therefore, the variation (tolerance) of a permissible bending angle is set to a narrow range for the floor brace.

Hitherto, the tolerance range of the bending angle is set narrow for the floor brace member that is difficult to bend as described above.

Therefore, the present specification discloses a vehicle body front structure that eliminates the need for a high-level machining technique in bending a floor brace.

The present specification discloses a vehicle body front structure. The vehicle body front structure includes an instrument panel reinforcement and a floor brace.

The instrument panel reinforcement extends in a vehicle width direction.

The floor brace supports the instrument panel reinforcement in a vertical direction.

The floor brace includes a first brace component and a second brace component.

A lower end of the first brace component is connected to a vehicle body floor.

An upper end of the first brace component is connected to the instrument panel reinforcement.

The second brace component is shorter than the first brace component.

The second brace component includes a fastening piece and an attachment piece. The fastening piece is fastened to the first brace component. The attachment piece is bent from the fastening piece.

An in-vehicle component is attached to the attachment piece.

In the above configuration, the floor brace is divided into the long first brace component and the short second brace component. The second brace component is bent. In the bending of the second brace component, a tolerance is defined. Since the second brace component is short, the occurrence of a case where the tolerance range is excessively narrow is reduced.

In the above configuration, the instrument panel reinforcement may include a bracket. The bracket may extend rearward.

The upper end of the first brace component and the fastening piece of the second brace component may be fastened to the bracket.

In the above configuration, at least three members (bracket, first brace component, second brace component) are stacked at a fastening point between an instrument panel and the floor brace. This improves the rigidity of the fastening point.

In the above configuration, the upper end of the first brace component, the fastening piece of the second brace component, and the bracket may each have a groove shape in cross section.

In this case, the first brace component may be laid on the bracket.

The fastening piece of the second brace component may be laid on the upper end of the first brace component.

The upper end of the first brace component and the fastening piece of the second brace component may be supported at one point on the bracket.

A side wall of the bracket and a side wall of the upper end of the first brace component may be spaced apart from each other.

The first brace component and the second brace component are supported at one point on the bracket.

The side wall of the bracket and the side wall of the upper end of the first brace component are spaced apart from each other.

Thus, the first brace component and the second brace component are pivotable relative to the bracket. For example, in the event of front collision of the vehicle, the instrument panel reinforcement is moved rearward by being pushed by a device in an engine compartment.

The rearward movement of the instrument panel reinforcement causes the bracket to pivot about the one support point relative to the first brace component and the second brace component. This pivoting avoids, in particular, bending deformation of the first brace component. As the pivoting of the bracket progresses, the side wall of the bracket and the side wall of the first brace component collide with each other. The side wall of the first brace component and the side wall of the second brace component receive the side wall of the bracket. Deformation of the first brace component is suppressed as compared with a case where the side wall of the bracket is received by one side wall.

In the above configuration, the attachment piece may extend in the vehicle width direction along the instrument panel reinforcement.

With the above configuration, a plurality of in-vehicle components can be aligned along the instrument panel reinforcement.

In the above configuration, the first brace component may be disposed closer to a passenger seat with respect to a center in the vehicle width direction.

In this case, the second brace component may be disposed in a clearance in the vehicle width direction between the first brace component and a glove box.

The in-vehicle component may have a thin rectangular parallelepiped shape.

The in-vehicle component may be vertically disposed while a principal surface having a largest area faces a side surface of the glove box.

With the above configuration, the in-vehicle component can be disposed in conformity with the shape of the glove box.

The vehicle body front structure disclosed herein eliminates the need for a high-level machining technique in bending the floor brace.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a vehicle body front structure according to an embodiment will be described with reference to the drawings. The shapes, materials, numbers, and numerical values described below are illustrative examples. These shapes and the like can be appropriately changed according to the specifications of the vehicle body front structure. In the following, like elements are given the same reference signs in all drawings.

In FIG. 1 to FIG. 4, the front and rear directions of the vehicles are indicated by FR shafts. The vehicle-width direction is indicated by RW shaft. Further, the height of the vehicle is indicated by UP shaft. FR shaft, RW shaft, and UP shaft are perpendicular to each other. The front of FR shaft is the positive. The right-hand side of RW axis is the positive direction. UP shaft shall be in the upward direction.

Figure 1:
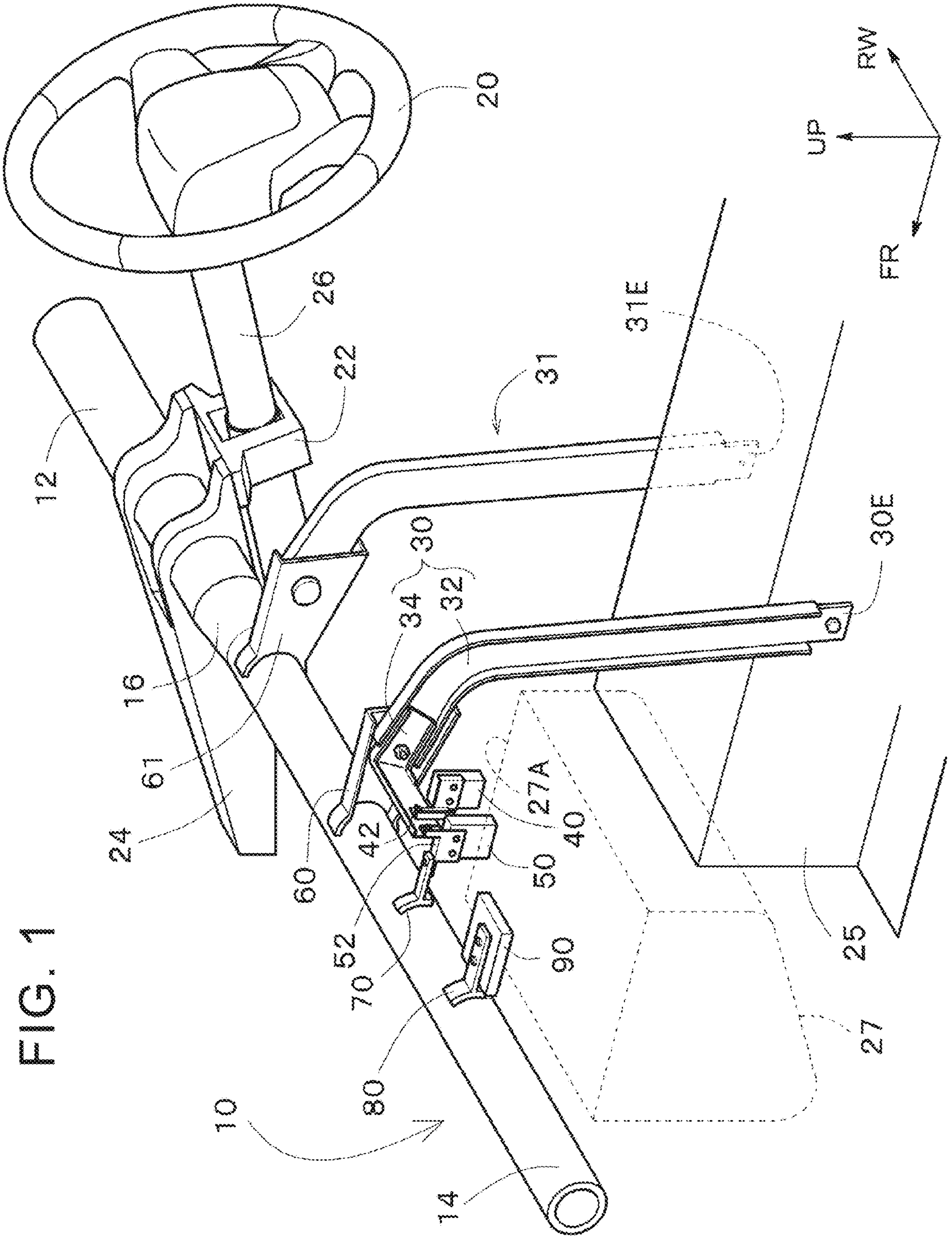
FIG. 1 is an overall perspective view illustrating a vehicle body front structure according to the present embodiment.

FIG. 1 illustrates a vehicle body front structure according to the present embodiment. Specifically, the skeletal structure of the front portion of the vehicle cabin is illustrated in FIG. 1. As the skeleton structure, the instrument panel reinforcement 10 and the floor braces 30 and 31 are arranged in the vehicle body front structure.

The instrument panel reinforcement 10 is hereinafter referred to as an instrument panel R/F 10 as appropriate. The instrument panel R/F 10 extends in the vehicle-width direction. The instrument panel R/F 10 is made of, for example, a pipe material. The instrument panel R/F 10 includes a D pipe 12 and a P pipe 14. The D-pipe 12 is a pipe on the driver's seat side. The P-pipe 14 is a pipe on the front passenger seat side.

The D-pipe 12 has higher rigidity than the P-pipe 14. For example, the diameter of the D pipe 12 is larger than that of the P pipe 14. As illustrated in FIG. 1, a reduced diameter portion 16 is provided between the D pipe 12 and the P pipe 14. For example, the D pipe 12 and the P pipe 14 are inserted into the reduced diameter portion 16. Further, the reduced-diameter portion 16 and the D-pipe 12, and the reduced-diameter portion 16 and the P-pipe 14 are joined by full-circumference welding or the like.

The instrument panel R/F 10 supports the steering column 26. The steering column 26 extends in the vehicle front-rear direction. The steering column 26 is supported by the instrument panel R/F 10 via the steering support 24 and the steering bracket 22. A steering wheel 20 is attached to a rear end of the steering column 26.

In addition, an audio device (not shown), a front airbag, or the like is attached to the instrument panel R/F 10 in addition to the steering device.

A plurality of ECUs (in-vehicle components) is mounted on the vehicles. ECU is an electronic control unit, for example a computer. An ECU is provided for each function of the vehicles. For example, a motor ECU for controlling a motor as a drive source is mounted on a vehicle. In addition, a battery ECU for managing SOC and the like of the battery is mounted on the vehicle. Further, an air-conditioning ECU for controlling the air-conditioning equipment is mounted on the vehicle.

When these various ECU are placed under the floor, the vehicle cabin space becomes narrow accordingly. Therefore, the plurality of ECUs is housed in the instrument panel. For example, ECU 90 is attached to the instrument panel R/F 10. ECU 40, ECU 50 is also attached to the floor brace 30. The support construction of these ECU is described below.

Both vehicle-width-direction ends of the instrument panel R/F 10 are fixed to front pillars (not shown). For example, the instrument panel R/F 10 is positioned at the same height as the steering wheel 20.

The instrument panel R/F 10 is supported by the floor braces 30 and 31. The floor braces 30 and 31 vertically support the instrument panel R/F 10. The floor braces 30, 31 are reinforcing or skeletal parts. The floor braces 30, 31 are metal parts, for example made of steel.

The floor braces 30 and 31 extend in the vertical direction. More specifically, the floor braces 30 and 31 have a boomerang structure in a side view (RW axial view), that is, the floor braces 30 and 31 include an upper portion that extends in the vehicle front-rear direction and a lower portion that extends in the vehicle up-down direction.

Figure 2:
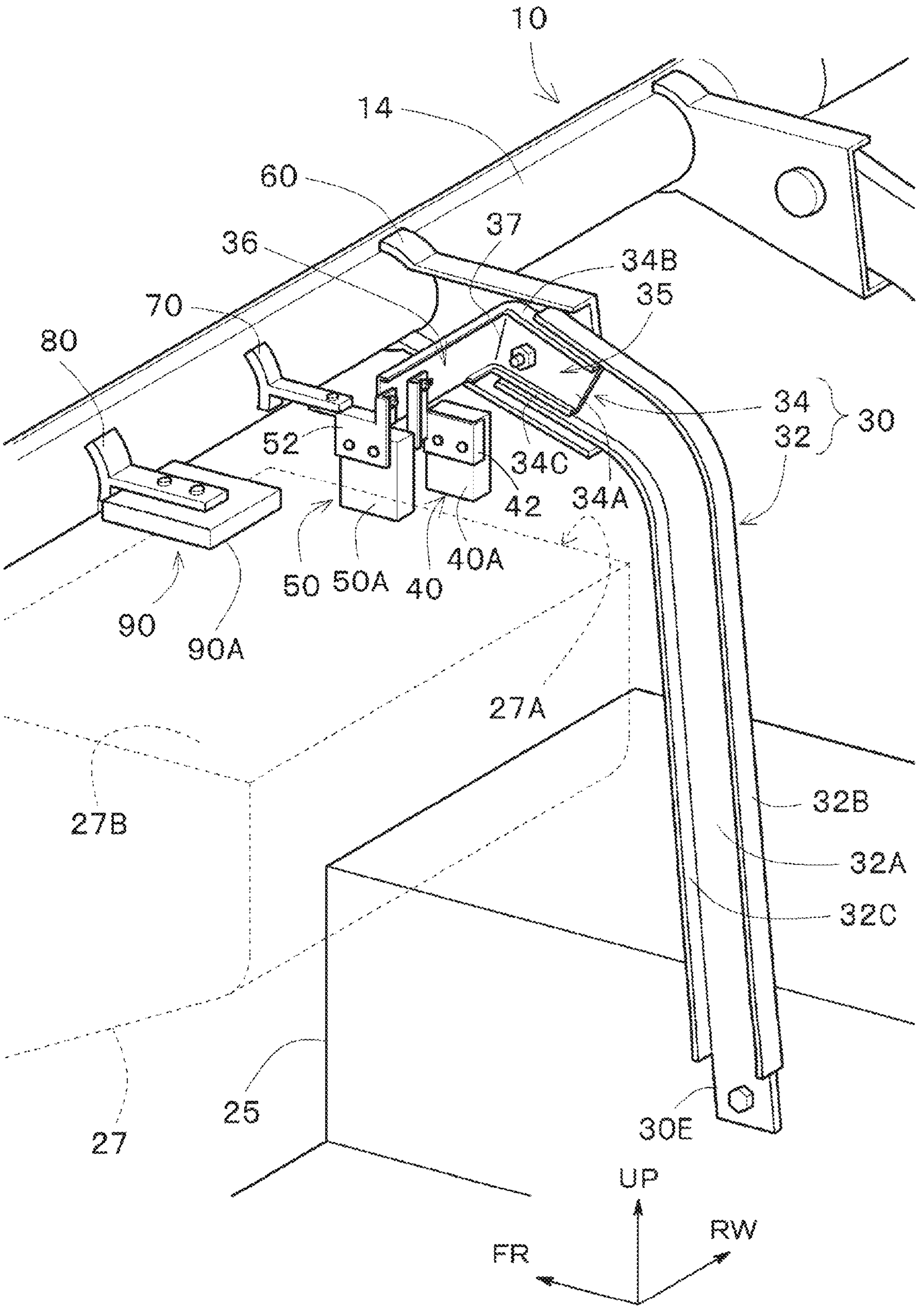
FIG. 2 is an enlarged perspective view of the periphery of the floor brace.

The floor braces 30, 31 are groove-shaped in cross section. For example, as illustrated in FIG. 2, the floor brace 30 comprises a bottom-wall 32A that is the bottom of the channel. The floor brace 30 includes side wall 32B, 32C at both ends of the bottom wall 32A. The floor brace 31 on the driver's seat side has the same structure as described above. The floor braces 30 and 31 are arranged such that the open end of the groove faces outward in the vehicle width direction.

The floor braces 30 and 31 are connected to the vehicle body floor. That is, a flanged 30E, 31E (see FIG. 1) is formed at the lower ends of the floor braces 30 and 31. A fastening hole (not shown) is drilled through the flanged 30E, 31E in the thickness direction. A floor tunnel 25 is disposed in the vehicle body floor portion. The floor tunnel 25 is disposed at the center of the vehicle body in the vehicle width direction. The floor tunnel 25 extends in the vehicle front-rear direction.

The floor tunnel 25 has, for example, a rectangular tubular cross section. The flanged 30E, 31E of the floor braces 30, 31 abut against the side walls of the floor tunnel 25. In addition, the bolt-nut fastening fixes the flanged 30E, 31E to the side wall of the floor tunnel 25.

The instrument panel R/F 10 includes brace brackets 60 and 61. The upper ends of the floor braces 30 and 31 are connected to the instrument panel R/F 10 via the brace brackets 60 and 61. The brace brackets 60 and 61 extend rearward from the rear surface of the instrument panel R/F 10. The front ends of the brace brackets 60, 61 are welded to the instrument panel R/F 10.

Figure 3:
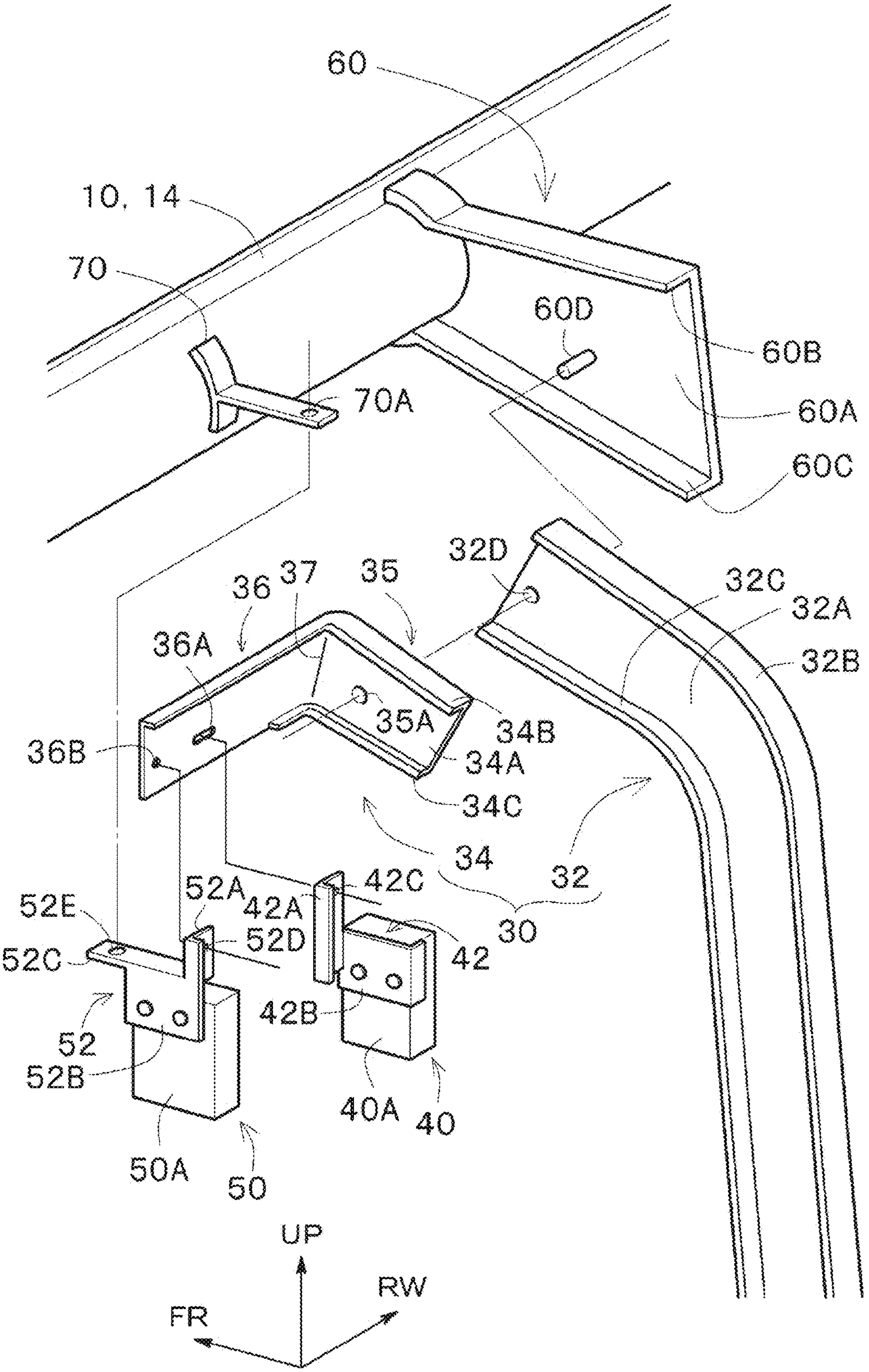
FIG. 3 is an exploded perspective view for explaining the assembly of the main configuration of FIG. 2.

FIG. 3 illustrates an exploded perspective view of the brace bracket 60 on the passenger seat side and its peripheral structure. The brace bracket 60 has a groove-shaped cross section. That is, the brace bracket 60 includes a bottom-wall 60A and a side wall 60B, 60C. The groove width of the brace bracket 60 becomes wider toward the rear. With such a widened shape, the brace bracket 60 can be rotated with respect to the floor brace 30. Details of the rotation structure will be described later.

Further, a stud bolt 60D is disposed on the bottom wall 60A of the brace bracket 60. The shaft portion of the stud bolt 60D extends outward in the vehicle-width direction. A fastening hole 32D of the first brace component 32 and a fastening hole 35A of the second brace component 34 are inserted into the stud bolt 60D.

FIG. 2 illustrates the floor brace 30 on the front passenger seat side and the peripheral structure thereof. The floor brace 30 is disposed closer to the passenger seat than the center in the vehicle width direction. A glove box 27 is disposed opposite the passenger seat. The glove box is supported on the instrument panel R/F 10 by a support mechanism (not shown).

The glove box 27 comprises an inner wall 27A. The inner wall 27A is parallel to UP-FR plane. That is, the inner wall 27A faces the vehicle-width direction. A gap is provided between the inner wall 27A of the glove box 27 and the floor brace 30. This gap is used as a mounting area for ECU 40, 50. The mounting of ECU will be described later.

Detailed Structure of the Floor Brace

Referring to FIG. 2, the upper end of the floor brace 30 on the front passenger seat side is bent outward in the vehicle width direction. The folded extension is an attachment piece 36. An ECU 40, 50 is attached to the attachment piece 36. That is, the floor brace 30 extends upward from the lower end, and is bent in the vehicle width direction at the upper end. For example, the floor brace 30 has an inverted L-shape in a front view of the vehicle.

The floor brace 30 includes a first brace component 32 and a second brace component 34. The first brace component 32 extends in the up-down direction. A flanged 30E is provided at the lower end of the first brace component 32. That is, the first brace component 32 is connected to the floor tunnel 25 (vehicle body floor). The first brace component 32 also extends upwardly from the flanged 30E. Further, the upper end of the first brace component 32 is connected to the instrument panel R/F 10 via the brace bracket 60.

The first brace component 32 is grooved in cross-section, except for the flanged 30E. That is, the first brace component 32 includes a bottom-wall 32A and a side wall 32B, 32C. For example, the first brace component 32 is not bent in the vehicle width direction but extends in the up-down and front-rear directions.

Since the first brace component 32 is connected to the brace bracket 60 and the floor tunnel 25, it has a supporting function of vertically supporting the instrument panel R/F 10.

Referring to FIG. 3, a fastening hole 32D is drilled in an upper end of the bottom-wall 32A of the first brace component 32. When assembling the floor brace 30, the stud bolt 60D of the brace bracket 60 is inserted into the fastening hole 32D.

The second brace component 34 is disposed at an upper end of the first brace component 32. The second brace component 34 is disposed in a gap in the vehicle width direction between the first brace component 32 and the glove box 27 (see FIG. 2). The second brace component 34 includes a fastening piece 35 and an attachment piece 36. The second brace component 34 is an L-shaped part. That is, in the second brace component 34, the fastening piece 35 is provided on one side and the attachment piece 36 is provided on the other side with the bent portion 37 as a boundary. In other words, the attachment piece 36 is bent in the vehicle width direction with respect to the fastening piece 35.

The second brace component 34 is shorter than the first brace component 32. Also of course, the second brace component 34 is shorter than the conventional floor brace connecting the floor tunnel and the instrument panel R/F. Therefore, the tolerance of the bending angle with respect to the second brace component 34 is set to a wide range as compared with the case of bending a long object such as a conventional floor brace. That is, the processing becomes easy.

Figure 4:
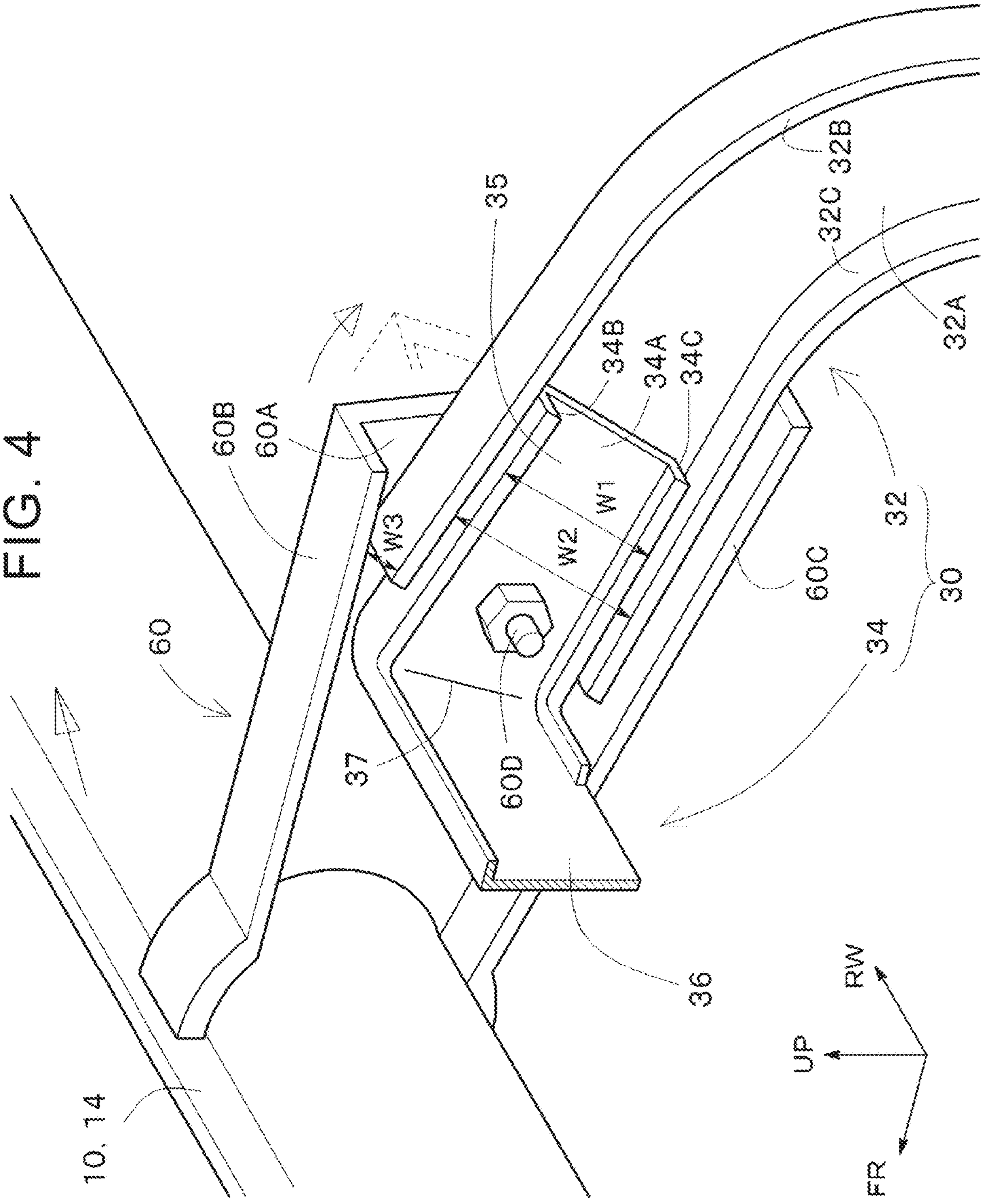
FIG. 4 is an enlarged perspective view for explaining a peripheral structure of a fastening point between a floor brace and a brace bracket.

FIG. 3 and FIG. 4 illustrate the detailed structure of the second brace component 34. The fastening piece 35 of the second brace component 34 has a groove-shaped cross section. That is, the fastening piece 35 includes a bottom-wall 34A and a side-wall 34B, 34C. A fastening hole 35A is drilled in the bottom wall 34A. When assembling the floor brace 30, the stud bolt 60D of the brace bracket 60 is inserted into the fastening hole 35A.

The fastening piece 35 is superimposed on the upper end of the first brace component 32. Therefore, the bottom-wall 34A of the fastening piece 35 faces the vehicle-width direction. The fastening piece 35 extends in the vehicle front-rear direction and the up-down direction. The attachment piece 36 is bent with respect to the fastening piece 35. Along the instrument panel R/F 10, the attachment piece 36 extends in the vehicle-width direction.

An ECU 40, 50, which is an in-vehicle component, is attached to the attachment piece 36. In the attachment piece 36, the side wall 34C is partially omitted. By omitting the side wall 34C, the accessibility of ECU brackets 42 and 52 to the bottom wall 34A is improved.

A fastening hole 36A, 36B is drilled in the bottom-wall 34A of the attachment piece 36. In the fastening hole 36A, 36B, the fastening hole 36A on the vehicle width-direction inner side may be a long hole. For example, the fastening hole 36A is an elongated hole whose longitudinal direction is the vehicle-width direction. By making the fastening hole 36A an elongated hole, ECU brackets 42 and ECU 40 to be attached to the fastening hole 36A can be finely adjusted in the vehicle-width-direction position.

As described above, in the floor brace 30 according to the present embodiment, the first brace component 32 is exclusively responsible for the support function of the instrument panel R/F 10. And the second brace component 34 is the sole supporter of ECU 40, 50.

For example, depending on the type of vehicle, the size and the number of ECU mounted on the vehicle may be changed. In such cases, only by changing the shape of the second brace component 34 in the floor brace 30, ECU can be changed.

FIG. 4 shows an example in which the first brace component 32 and the second brace component 34 are fastened to the brace bracket 60. Note that a part of the attachment piece 36 is not shown in the second brace component 34. As described above, the upper end of the first brace component 32, the fastening piece 35 of the second brace component 34, and the brace bracket 60 are groove-shaped in cross section. The upper end of the first brace component 32 is superimposed on the brace bracket 60. Further, a fastening piece 35 of the second brace component 34 is superimposed on the upper end of the first brace component 32.

As illustrated in FIGS. 3 and 4, in a process in which the first brace component 32 and the second brace component 34 are superposed on the brace bracket 60, the stud bolt 60D is inserted into the fastening hole 32D, 35A. Further, the stud bolt 60D is nut-tightened. Thus, at the fastening point, the three parts of the first brace component 32, the second brace component 34 and the brace bracket 60 are stacked and fastened. For example, the strength of the fastening point is improved as compared with the case where two parts are stacked.

As also illustrated in FIG. 4, the first brace component 32 and the second brace component 34 are fastened to the brace bracket 60 only by the stud bolt 60D and the nut screwed into the stud bolt. That is, the first brace component 32 and the second brace component 34 are supported by the brace bracket 60 at one point.

Further, the groove width of the brace bracket 60 is larger than the groove width of the first brace component 32. Similarly, the groove width of the first brace component 32 is larger than the groove width of the second brace component 34.

For example, the inner groove width W2 of the first brace component 32 is substantially equal to the outer groove width W1 of the fastening piece 35. The outer groove width W1 indicates the distance between the outer surfaces of the side wall 34B, 34C. The inner groove width W2 indicates the distance between the inner surfaces of the side wall 32B, 32C. That is, the dimensional play between the second brace component 34 and the first brace component 32 is set to be small. For example, when the second brace component 34 is laid over the first brace component 32, the side wall 32B, 32C and the side wall 34B, 34C are contacted.

In contrast, as shown in the gap W3, the upper side wall 32B of the first brace component 32 and the upper side wall 60B of the brace bracket 60 are spaced apart. That is, a dimensional play is set between the first brace component 32 and the brace bracket 60.

For example, in the event of a front collision of a vehicle, equipment in the engine compartment is pushed backward. Accordingly, the instrument panel R/F 10 is also pushed toward the rear of the vehicle. At this time, as illustrated by the arrows in FIG. 4, the brace bracket 60 rotates with respect to the first brace component 32 around the stud bolt 60D, that is, one turning point. Such rotation suppresses buckling and breakage of the first brace component 32.

Further, as the brace bracket 60 advances in rotation, the side wall 60B impinges on the side wall 32B of the first brace component 32. At this time, the side wall 34B of the second brace component 34 is disposed inside the side wall 32B. That is, the two side walls of the side wall 32B and the side wall 34B receive the side wall 60B of the brace bracket 60. Deformation of the first brace component 32 is suppressed as compared to receiving the side wall 60B of the brace bracket 60 with one of the side wall 32B.

ECU Support Construction

As illustrated in FIGS. 2 and 3, an ECU 40, 50 is attached to the attachment piece 36. More specifically, ECU 40, 50 is attached to the attachment piece 36 via ECU brackets 42, 52.

Referring to FIG. 3, ECU brackets 42 include an arm 42A and a support piece 42B. The arm 42A extends vertically. A fastening hole 42C is drilled in the upper end of the arm 42A. The fastening hole 42C and the fastening hole 36A of the attachment piece 36 are axially aligned with each other. Then, ECU brackets 42 are bolted to the attachment piece 36.

A support piece 42B is connected to a lower end of the arm 42A. The support piece 42B is substantially parallel to UP-FR plane. That is, the support piece 42B faces the vehicle width-direction, and ECU 40 that is an in-vehicle component is supported on the support piece 42B. ECU 40 is a thin rectangular parallelepiped. Among the faces constituting the rectangular parallelepiped, the main surface 40A having the largest area is brought into contact with the support piece 42B. With such a support configuration, as illustrated in FIG. 2, the main surface 40A faces the side surface of the glove box 27, that is, the inner wall 27A.

ECU brackets 52 include an arm 52A, 52C and a support piece 52B. As illustrated in FIG. 3, the arm 52C extends forward. A fastening hole 52E is drilled in the front end of the arm 52C. The fastening hole 52E is aligned with the fastening hole 70A of the sub-bracket 70. Then, ECU bracket 52 is bolted to the sub-bracket 70. Here, the front end of the sub-bracket 70 is welded and fixed to the instrument panel R/F 10.

The arm 52A extends vertically. A fastening hole 52D is drilled in the upper end of the arm 52A. The fastening hole 52D and the fastening hole 36B of the attachment piece 36 are axially aligned with each other. Then, ECU brackets 52 are bolted to the attachment piece 36.

A support piece 52B is connected to a lower end of the arm 52A. The support piece 52B is substantially parallel to UP-FR plane. That is, the support piece 52B faces the vehicle width-direction, and ECU 50 that is an in-vehicle component is supported on the support piece 52B. ECU 50 is a thin rectangular parallelepiped. Among the faces constituting the rectangular parallelepiped, the main surface 50A having the largest area is brought into contact with the support piece 52B. With such a support configuration, as illustrated in FIG. 2, the main surface 50A faces the side surface of the glove box 27 (see FIG. 2), that is, the inner wall 27A.

As described above, ECU 40, 50, which is an in-vehicle component, is arranged such that the main surface 40A, 50A faces the inner surface of the glove box 27. In other words, as illustrated in FIG. 2, ECU 40, 50 is vertically disposed in the space between the glove box 27 and the floor brace 30. In this way, ECU 40, 50 is arranged along the geometry of the glove box 27.

Further, an ECU 90 is disposed on the upper wall 27B of the glove box 27. The upper wall 27B is parallel to FR-RW plane. In other words, the upper wall 27B faces upward. ECU 90 is a thin rectangular parallelepiped and is horizontally arranged by ECU brackets 80. That is, the main surface 90A of ECU 90 faces the upper wall 27B. In this way, ECU 90 is arranged along the geometry of the glove box 27.

By arranging ECU 40, 50, 90 along the shape of the glove box 27, the space around the glove box 27 can be effectively used as the arrangement space of ECU. The position and orientation of ECU 40, 50, 90 are determined along the shapes of the glove box 27. This suppresses the volume reduction of the glove box 27 when the number of ECU is increased.

What is claimed is:

1. A vehicle body front structure comprising:

an instrument panel reinforcement extending in a vehicle width direction; and a floor brace that supports the instrument panel reinforcement in a vertical direction, wherein:

the floor brace includes a first brace component and a second brace component;

the first brace component is disposed closer to a passenger seat with respect to a center in the vehicle width direction;

a lower end of the first brace component is connected to a vehicle body floor;

an upper end of the first brace component is connected to the instrument panel reinforcement;

the second brace component is disposed in a clearance in the vehicle width direction between the first brace component and a glove box;

the second brace component is shorter than the first brace component;

the second brace component includes a fastening piece fastened to the first brace component, and an attachment piece bent from the fastening piece;

the attachment piece extends in the vehicle width direction along the instrument panel reinforcement;

an in-vehicle component is attached to the attachment piece;

the in-vehicle component has a thin rectangular parallelepiped shape; and the in-vehicle component is vertically disposed while a principal surface having a largest area faces a side surface of the glove box.

2. The vehicle body front structure according to claim 1, wherein:

the instrument panel reinforcement includes a bracket extending rearward; and the upper end of the first brace component and the fastening piece of the second brace component are fastened to the bracket.

3. The vehicle body front structure according to claim 2, wherein:

the upper end of the first brace component, the fastening piece of the second brace component, and the bracket each have a groove shape in cross section;

the first brace component is laid on the bracket;

the fastening piece of the second brace component is laid on the upper end of the first brace component;

the upper end of the first brace component and the fastening piece of the second brace component are supported at one point on the bracket; and a side wall of the bracket and a side wall of the upper end of the first brace component are spaced apart from each other.

* * * * *